US005236780A

United States Patent [19]
Yamane et al.

[11] Patent Number: 5,236,780
[45] Date of Patent: Aug. 17, 1993

[54] IMAGE-RETRANSFERABLE SHEET

[75] Inventors: Mitsuo Yamane, Yotsukaichi; Takashi Kawaguchi, Aichi, both of Japan

[73] Assignee: Brother Kogyo Kabushiki Kaisha, Aichi, Japan

[21] Appl. No.: 979,437

[22] Filed: Nov. 20, 1992

Related U.S. Application Data

[63] Continuation of Ser. No. 666,743, Mar. 8, 1991, abandoned.

[30] Foreign Application Priority Data

Mar. 16, 1990 [JP] Japan .................................. 2-67973
Mar. 16, 1990 [JP] Japan .................................. 2-67974

[51] Int. Cl.5 ............................................ B32B 9/00

[52] U.S. Cl. ................................ 428/402.2; 428/201; 428/204; 428/220; 428/321.5; 428/424.4; 428/914

[58] Field of Search ..................... 428/195, 321.5, 204, 428/201, 402.2, 913, 914, 220, 424.4

[56] References Cited

U.S. PATENT DOCUMENTS 4,654,256 3/1987 Doree et al. ..................... 428/321.5

FOREIGN PATENT DOCUMENTS 57-128595 8/1982 Japan .
63-128987 6/1988 Japan .
63-246298 10/1988 Japan .

*Primary Examiner*—Patrick J. Ryan
*Assistant Examiner*—W. Krynski
*Attorney, Agent, or Firm*—Oliff & Berridge

[57] ABSTRACT

An image-retransferable sheet for dry-processing type image-transferring materials is disclosed, which comprises a substrate having on one surface thereof a surface treating agent layer which has a tensile strength of from 1 to 100 kg/cm$^2$ or an elongation of at least 100% and which contains pressure-rupturing microcapsules enclosing a perfume. The image-retransferable sheet is not suffered generation of unpleasant smell upon pressure-sensitive retransfer.

14 Claims, 2 Drawing Sheets

IMAGE-RETRANSFERABLE SHEET

This is a Continuation of U.S. application Ser. No. 07/666,743 filed Mar. 8, 1991, now abandoned.

BACKGROUND OF THE INVENTION

The present invention relates to an image-retransferable sheet for a dry-processing type image-transferring material which is capable of transferring an image such as letters, signs, figures or the like onto the surface of a desired substance by applying pressure to the image-transferring material whose image-bearing surface is brought into contact with the surface of the substance (hereafter referred to as "pressure-sensitive retransfer"). More specifically, it relates to an image-retransferable sheet of such an image-transferring material produced by thermally printing or transferring an image on the sheet with a thermally transferring type printing device such as a printer, a typewriter, a word processor or the like (hereafter referred to as "heat-sensitive transfer").

As a base sheet (image-retransferable sheets) for dry-processing type image-transferring materials produced by heat-sensitive transfer, JP-A-63-128987 discloses films of polyethylene, polypropylene, fluorine-containing resins, etc., or silicone resin-coated sheets of paper, metal foils, plastic films, etc., which have a smooth surface and exhibit a water-contact angle of at least 95°. (The term "JP-A" used herein means an unexamined published Japanese patent application.)

In formation of an ink image on such a base sheet having a water-contact angle of 95° or more (particularly 105° or more) by heat-sensitive transfer, an ink temperature is necessarily increased to reduce surface tension of the ink and wet the surface of the base sheet to an extent that adhesion of the ink to the base sheet becomes larger than cohesive force of the ink and adhesion of the ink to an ink-donating base film such as a polyethylene terephthalate (PET) film. Thus, high thermal energy is required for the image formation, and it is very disadvantageous to devices for heat-sensitive transfer concerning durability of a thermal head and load to an electric source.

Further, ink images formed on such a surface of poor wettability are easily retransferred merely with little pressure applied thereto because of its poor adhesion to the surface so that, upon retransfer of certain portions of the images, the other portions of the images are undesirably retransferred and stain the intended images. Mere touch in handling of the image-formed sheet often removes the images therefrom.

Furthermore, when the base sheet having a thermally transferred ink image is subjected to pressure-sensitive retransfer, the sheet is not easily fixed on an image-receiving substance since it has an extremely small coefficient of static friction, resulting in failure of image-retransfer getting out of position or with distortion.

In order to prevent the base sheet from slipping, it is described in JP-A-63-246298 to provide a sticky layer apart from thermally transferred images on the base sheet. However, an additional means is required to provide such a sticky layer at predetermined portions of the base sheet, and a device for the above purpose is needed. Further, the sticky layer has to be covered with a separable sheet, etc. before use, requiring further additional means and costs. In the case of using a silicone resin-coated sheets as a base sheet as described above, two layers, i.e., the silicone resin layer and the sticky layer must be provided and it may well be that one of the two layers previously coated has influence on the other. That is, when a silicone resin is first coated on a sheet, a sticky material is repelled when coated on the silicone resin layer. When the sticky material is first coated at portions of a sheet, its stickiness makes it difficult to coat the silicone resin on the sheet. Even if a separable sheet is provided on the sticky layer, difficulty in coating of the silicone resin cannot be eased because of increased thickness at the sticky layer-formed portions. Even with the two layers properly coated, fixation of the sheet is yet insufficient as the sticky layer exists only in portions not fully surrounding areas to which thermally transferred images are provided.

In order to solve the above problems, the present inventors previously made an intensive study and proposed an image-retransferable sheet having a transferable layer of surface treating agent, as described in U.S. Pat. application Ser. No. 408,236 filed Sep. 18, 1989, now abandoned. The surface treating agent used therein has a tensile strength of from 1 to 100 $kg/cm^2$ and a melting or softening point of at least 100° C. or a melt viscosity at 100° C. of at least 1,000 poises. The present inventors also provided another image-retransferable sheet having a surface treating agent layer exhibiting a certain elongation, as described in U.S. Pat. application Ser. No. 405,279 filed Sep. 11, 1989, now U.S. Pat. No. 4,973,509. The surface treating agent contains an ethylene/vinyl acetate copolymer or polyethylene and exhibits an elongation of at least 100%.

In the case of pressure-sensitive retransfer of large images from the image-retransferable sheets, the opposite surface to the image-bearing surface of the sheet has to be rubbed thoroughly and patiently, generating unpleasant smell from the ink images or the sheet so that practitioners feel badly displeased and are annoyed with the smell during the operation of image-retransfer.

SUMMARY OF THE INVENTION

The first object of the present invention is to provide an image-retransferable sheet which is free from generation of such unpleasant smell, with which practitioners are pleased to conduct the operation of image-retransfer, and which can impart fragrance to the resulting retransferred image.

The second object of the present invention is to provide an image-retransferable sheet which can be easily fixed upon pressure-sensitive retransfer.

The third object of the present invention is to provide an image-retransferable sheet capable of retaining an ink image thereon even when rubbed slightly or applied low pressure, i.e., having good image-rubbing resistance.

The fourth object of the present invention is to provide an image-retransferable sheet capable of being thermally transferred (printed) an image with good image quality merely by application of low thermal energy.

The fifth object of the present invention is to provide an image-retransferable sheet capable of completely retransferring a thermally transferred image onto an image-receiving substance with no residual ink on the sheet.

The sixth object of the present invention is to provide an image-retransferable sheet which makes it easy to confirm whether a thermally transferred image on the sheet has been retransferred to an image-receiving substance.

The seventh object of the present invention is to provide an image-retransferable sheet capable of forming an image having improved rubbing resistance on an image-receiving substance by pressure-sensitive retransfer.

The eighth object of the present invention is to provide an image-retransferable sheet having an increased adhesion to an ink image as compared to conventional ones, yet providing good pressure-sensitive retransferring properties.

These objects of the present invention have been attained by an image-retransferable sheet for dry-processing type image-transferring materials produced by thermally transferring an image on the sheet, which comprises a substrate having on one surface thereof a surface treating agent layer which has a tensile strength of from 1 to 100 $kg/cm^2$ or an elongation of at least 100% and which contains pressure-rupturing microcapsules enclosing a perfume.

DETAILED DESCRIPTION OF THE INVENTION

Figure 1:
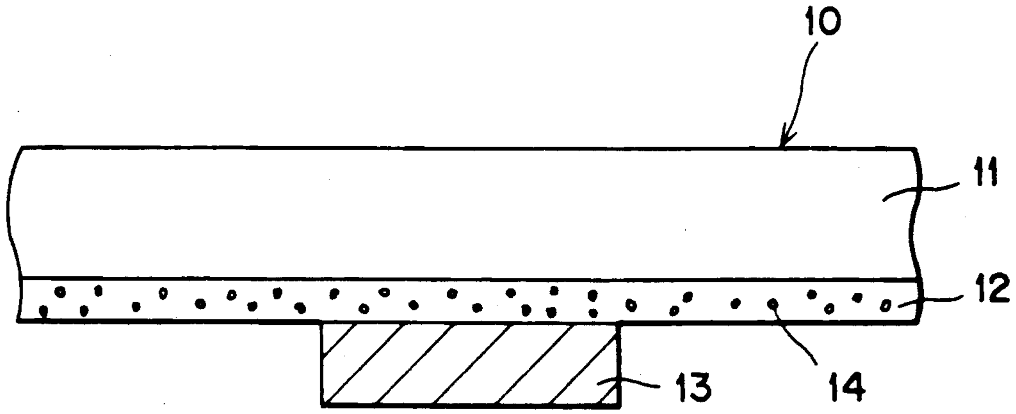
FIG. 1 illustrates a sectional view of an image-retrans-ferable sheet of the present invention having an image thermally transferred image on the surface thereof.

As shown in FIG. 1, image-retransferable sheet 10 of the present invention comprises substrate 11 having on one surface thereof surface treating agent layer 12 which contains pressure- rupturing microcapsules 14 enclosing a perfume. Ink image 13 is thermally transferred onto the surface of the layer 12.

The substrate 11 for use in the present invention generally has a thickness of from 25 to 200 microns and preferably from 50 to 150 microns. If the thickness is more than 200 microns, pressure cannot effectively be applied to an image-bearing surface of the resulting sheet upon pressure-sensitive retransfer due to lack of flexibility, so that failure in image-retransfer tends to occur. If it is less than 25 microns, on the other hand, such substrates do not possess sufficient mechanical strength for production in many cases, and they are elongated by the applied pressure, resulting in distortion of an image retransferred on an image-receiving substance. The substrate preferably has an elongation of not more than 200%.

To ensure perfect retransfer of an image by pressure-sensitive. retransfer, the substrate is preferably transparent or semitransparent. In particular, semitransparent substrates are preferred since it is easy to check whether the image has completely been retransferred or not.

As a substrate, there may be used plastic films, paper, metal foils and the like. Examples of plastic films include films of polyethylene, polypropylene, fluorine-containing resins (e.g., ethylene-tetrafluoroethylene copolymer and tetrafluoroethylene-hexafluoroethylene copolymer), polyethylene terephthalate, polyamides, polyimides, polyvinyl chloride, polycarbonates, polysulfones, ethylene-vinyl acetate copolymer, acrylonitrile-butadiene-styrene copolymer, ionomers, and the like.

A thickness of the surface treating layer 12 coated on the substrate 11 is preferably equal to or less than 15 microns, more preferably equal to or less than 10 microns. The surface treating agent layer 12 is a layer having a tensile strength of from 1 to 150 $kg/cm^2$ (the first embodiment) or a layer having an elongation of at least 100% (the second embodiment).

According to the first embodiment of the present invention, the ink image 13 formed on the image-transferable sheet 10 can be retransferred together with the underlying surface treating agent from the sheet 10 to an image-receiving substance. If the tensile strength exceeds 100 $kg/cm^2$, the resulting surface treating agent layer exhibits too high cohesive force to be transferred. If it is less than 1 $kg/cm^2$, the layer strength is so small that the resulting layer is peeled off when the sheet 10 is bent. Therefore, the tensile strength of the surface treating agent layer 12 is more preferably of from 1 to 100 $kg/cm^2$.

The surface treating agent used in the first embodiment preferably has a melting or softening point of at least 90° C., more preferably at least 100° C., or a melt viscosity at 100° C. of at least 800 poises, more preferably at least 1,000 poises. Use of a surface treating agent which has a melting point of less than 100° C. or becomes too soft at that temperature causes failure in image-retransfer since the surface treating agent melts upon formation of transferred images by the previous heat-sensitive transfer to increase adhesion to the substrate 11.

Examples of the surface treating agent used in the first embodiment include polyethylene, ethylene-vinyl acetate copolymer, vinyl chloride-vinyl acetate copolymer, polyvinyl butyral, celluloses, ethylene-ethyl acrylate copolymer, ethylene-acrylic acid copolymer, ionomers, ethylene-methacrylic acid copolymer, polyvinyl alcohol, polyvinyl pyrrolidone, and silicone. They may be used alone or in combination of two or more.

In formation of the surface treating agent layer 12 using the above-described materials as a main component, they are preferably coated in the form of fine dispersion such as an emulsion or a suspension, rather than a hot-melt liquid or a solution using a solvent since the latter tends to form a layer having too high tensile strength. Fillers may be added to the layer 12 to adjust the tensile strength or adhesion.

With the surface treating agent layer 12 having the tensile strength and melting point (or softening point) or melt viscosity within the ranges as described above, an ink image which is formed on the layer 12 by heat-sensitive transfer can be retransferred together with the surface treating agent. Thus, there is no particular limit on wettability of the surface treating agent layer. Therefore, there are various advantages: a thermally transferred image can be formed on the layer 12 with low thermal energy; adhesion of the transferred image to the layer 12 can be enhanced to improve the image-rubbing resistance of an image-retransferable sheet; and the coefficient of static friction of an image-retransferable sheet can be increased to prevent from being moved during pressure-sensitive retransfer, providing a retransferred image having good image quality on an image-receiving substance with ease.

Retransfer of a thermally transferred ink image together with the underlying surface treating agent provides further advantages. That is, the thermally transferred ink image can be completely retransferred without residual ink, it is easy to confirm completion of image-retransfer, and the retransferred image has high rubbing resistance as the surface treating agent on the image acts as a protective layer.

According to the second embodiment of the present invention, the surface treating agent layer 12 has an elongation of at least 100%, more preferably at least 200%, whereby the layer 12 is elongated apart from an image formed thereon when applying pressure to the resulting image-retransferable sheet 10 upon image-retransfer, and adhesion between the layer 12 and the image is lowered. Thus, the image retransferable sheet of this embodiment exhibits excellent image-retransferring ability even using a surface treating agent having good ink-wettability and high adhesion. If the elongation is less than 100%, the adhesion between the layer 12 and the image cannot be lowered so that failure in image-retransfer tends to occur.

The surface treating agent layer 12 for use in the second embodiment preferably has a coefficient of static friction of at least 0.25, and more preferably 0.3 or more. If the coefficient of static friction is less than 0.25, the resulting image-retransferable sheet 10 is more likely to move upon image-retransfer so that perfect retransfer of an image is achieved with more difficulty.

It is also preferred that the layer 12 has a water-contact angle of from 80° to 120°, and more preferably from 80° to 110°. If the water-contact angle is less than 80°, the adhesion between the layer 12 and an image becomes so strong that failure in image-retransfer tends to occur. If it is more than 120°, the layer 12 has poor ink-wettability and failure in heat-sensitive transfer tends to occur. When the water-contact angle is within the range of from 80° to 120°, the surface treating agent layer 12 exhibits an optimum adhesion to an image so as to effect both the heat-sensitive transfer and the pressure-sensitive retransfer free from undesired retransfer in portions of the image merely with slight pressure applied for fixing the sheet 10 on an image-receiving substance or occasionally applied in handling of the sheet 10.

The surface treating agent layer 12 of this embodiment is mainly composed of one or more compounds selected from polyethylene, ethylene-vinyl acetate copolymer, ethylene-ethyl acrylate copolymer, ethylene-acrylic acid copolymer, ionomers, ethylene-methacrylic acid copolymer, and silicone. In order to adjust the wettability of the layer 12, a silicone oil, a silicone resin, a fluorine-containing compound, a polyethylene powder, a wax, or the like may be added.

With the surface treating agent layer 12 having the elongation, coefficient of static friction and water-contact angle within the ranges as described above, an image can be thermally transferred on the layer 12 with high image quality even by application of low thermal energy due to good wettability and high adhesion of the layer 12, yet being capable of pressure-sensitive retransfer from the layer 12 to an image-receiving substance without difficulty.

Various kinds of perfumes can be enclosed in the microcapsules 14 which are contained in the surface treating agent layer 12 of the present invention. Typical examples are shown below.

(1) Hydrocarbons (a) Cyclic Terpene Hydrocarbons alpha-pinene, beta-pinene, camphene, limonene, dipentene, phellandrene, and terpinolene (b) Sesquiterpenes cadinene, and caryophyllene (c) Aromatic Hydrocarbons p-cymene, and diphenylmethane (2) Alcohols (a) Aliphatic Alcohols n-octyl alcohol, n-nonyl alcohol, n-decyl alcohol, dimethyloctanol, and n-undecylene alcohol (b) Olefinic Terpene Alcohols linalool, tetrahydrolinalool, geraniol, nerol, citronellol, rhodinol, and hydroxycitronellol (c) Cyclic Terpene Alcohols alpha-terpineol, beta-terpineol, gamma-terpineol, isopulegol, menthol, borneol, and isoborneol (d) Sesquiterpene Alcohols farnesol, nerolidol, and santalol (e) Aromatic Alcohols benzyl alcohol, anise alcohol, gamma-phenylpropyl alcohol, cinnamic alcohol, methylphenylcarbinol, dimethylphenylcarbinol, dimethylbenzylcarbinol, beta-phenylethyldimethylcarbinol, beta-phenylethylmethylethylcarbinol, and phenoxyethyl alcohol (3) Phenols and Phenol Ethers anisole, p-acetylanisol, diphenyl oxide, dibenzyl ether, guaiacol, dimethylhydroquinone, p-cresol methyl ether, thymol, carvacrol, anethole, eugenol, isoeugenol, methyl eugenol, methyl isoeugenol, benzyl isoeugenol, safrole, isosafrole, beta-naphthol methyl ether, beta-naphthol ethyl ether, and beta-naphthol isobutyl ether (4) Aldehydes (a) Aliphatic Aldehydes n-heptylaldehyde, n-octylaldehyde, n-nonylaldehyde, nonadienal, n-decylaldehyde, n-undecylaldehyde, undecylenealdehyde, n-duodecylaldehyde, methynonylacetoaldehyde, n-tridecylaldehyde, n-tetradecylaldehyde, and n-hexadecylaldehyde (b) So-called C14, C16 and C18 Aldehydes gamma-undecalactone, ethyl methylphenylglycidate, and gamma-nonyllactone (c) Olefinic Terpenes citral, citronellal, and hydroxy cifronellal, (d) Aromatic Aldehydes benzaldehyde, p-tolylaldehyde, cuminaldehyde, phenylacetoaldehyde, p-tolylacetoaldehyde, phenylpropylacetoaldehyde, cinnamic aldehyde, alpha-amylcinnamic aldehyde, p-isopropyl-alpha-methylhydroxycinnamic aldehyde, salicylaldehyde, anisaldehyde, heliotropin, vanillin, and ethylvanillin (5) Ketones (a) Aliphatic Ketones methy n-amyl ketone, methyl n-hexyl ketone, methyl n-nonyl ketone, ethyl n-amyl ketone, methylheptenone, and diacetyl (b) Cyclic Terpene Ketones carvone, menthone, pulegone, piperitone, and camphor (c) Aromatic Ketones acetophenone, p-methylacetophenone, benzophenone, benzylideneacetone, methyl naphthyl ketone, ionone, methylionone, irone, jasmone, muscone, civetone, and exalton (6) Lactons and Oxides coumarin, ambrettolide, exaltolide, and cineole (7) Acids benzoic acid, cinnamic acid, phenylacetic acid, and hydrocinnamic acid (8) Esters (a) Aliphatic Acid Esters formates, acetates, propionates, butyrates, valerates, heptylates, heptynecarboxylates, octynecarboxylates, laurates, and myristates (b) Aromatic Acid Esters benzoates, phenylacetates, cinnamates, phthalates, salicylates, anisates, and anthranilates (9) Nitrogen-containing Compounds nitrobenzol, indole, skatole, quinoline derivatives, and artificial musk

(10) Halogen Compounds and Other Compounds bromostyrol, trichloromethyl phenyl carbinyl acetate, and acetals

(11) Natural Perfumes (a) Vegetable Perfumes lemon oil, orange oil, petigrain oil, neroli oil, bergamot oil, lavender oil, spike oil, patchouli oil, peppermint oil, perilla oil, rosemary oil, thyme oil, clary sage oil, palmarosa oil, ginger grass oil, lemongrass oil, citronella oil, vetiver oil, bois de rosa oil, cinnamone oil, quassia oil, linaloe oil, opopanax oil, bay oil, clove oil, cajuput oil, ajowan oil, anise oil, caraway oil, coriander oil, fennel oil, geranium oil, rose oil, sandalwood oil, ylang-ylang oil, cananga oil, jasmine oil, tuberose flower oil, star anise oil, orris oil, oakmoss, cedarwood oil, abies oil, turpentine oil, camphor oil, and kuromoji oil (b) Animal Perfumes musk, civet, castoreum, and amber gris The pressure-rupturing microcapsules 14 enclosing a perfume can be prepared by physical or mechanical methods such as an in-air suspension (fluidizied bed) method, a spray granulation method, a pan-coating method, an electrostatically combining method, and a vacuum deposition method; or physicochemical or chemical microcapsulation methods such as an interfacial polymerization method, an in-situ polymerization method, a complex coacervation method, a method utilizing the phenomenon of phase separation from organic solvents, an in-liquid drying microcapsulation method, a melt-disperse cooling microcapsulation method, and an in-liquid shell-hardening microcapsulation method.

In the physical or mechanical methods, microcapsulation is effected using, as a shell material, water-soluble substances such as gelatin, gum arabi, starch, polyvinyl pyrrolidone, carboxymethyl cellulose, hydroxyethyl cellulose, methyl cellulose, polyvinyl alcohol, and polyacrylic acid; water-insoluble substance such as ethyl cellulose, cellulose acetate, polymethacrylate, polyamides, polyethylene, nitrocellulose, and silicone; waxes such as paraffin, carnauba, breached bees wax, stearic acid, palmitic acid, stearyl alcohol, and glyceryl stearate; and substances soluble in intestin such as shellac, cellulose acetate phthalate, and cellulose acetate butyrate.

On the other hand, the aforesaid physicochemical or chemical microcapsulations are effected using, as a shell material, polyamides, polyurethanes, polyesters, polysulfonamides, polyureas, epoxy compounds, polysulfonates, polycarbonates, polyols, polyisocyanates, polyacrylic acid, polyamines, acrylate compounds, polysulfides, urea, gelatin, rubbers, ethyl cellulose, phenolic resins, maleic acid resins, polyvinyl chloride, polyvinyl acetate, polyvinylidene chloride, polyacrylic acid salts, waxes, fatty acids, polyethylene, polyvinyl alcohol, and the like.

In formation of images on the image-retransferable sheet of the present invention by heat-sensitive transfer, an ink ribbon used for a conventional thermally printing device can be used, and it comprises an ink layer mainly of wax coated on a film such as a PET film. It is preferred that the ink ribbon further comprises a transfer-controlling layer on the ink layer as an overcoat. The transfer-controlling layer has higher heat-sensitive adhesion, hardness, viscosity and cohesive force than the ink layer, and the layer markedly improves heat-sensitive transferring property even in the case of using an image-retransferable sheet having poor wettability. The transfer-controlling layer is transferred imagewise together with the ink layer by heat-sensitive transfer and is retransferred with the ink image and the surface treating agent upon pressure-sensitive retransfer. Besides, pressure-sensitive adhesiveness is imparted to the ink layer, whereby pressure-sensitive retransferring property of the resulting dry image-transferring material is further improved. Further, the ink layer may contain perfume-enclosing microcapsules as well.

Hitherto, a large image has been formed using a heat-sensitive transferring device having a small-serial thermal head by repeating heat-sensitive transfer of the large image line-by-line. Thus, a large image is formed by piecemeal. However, since each run of transfer has to be overlapped in parts of processed areas with a previous run, a previously transferred portion is often rubbed and removed upon the subsequent run. In order to avoid the undesired removal of the portions, heat-sensitive transfer is performed line-by-line to form on an image-retransferable sheet a large image divided into lines with leaving space between lines. In pressure-sensitive retransfer, such a divided large image is retransferred line-by-line on an image-receiving substance in such a manner that the lines are united one after another. According to the present invention, however, such a complicated process can be omitted. Since the image-retransferable sheet of the present invention has relatively high adhesion, a previously transferred portion is not removed by a subsequent run of heat-sensitive transfer and a large image can be formed on the sheet without leaving space between lines.

Operation of pressure-sensitive retransfer of an ink image which has been transferred on an image-retransferable sheet causes pain to a worker. Besides, the ink or the sheet often emits an offensive odor upon rubbing of the sheet with pressure. According to the present invention, however, the perfume-enclosing microcapsules dispersed in the surface treating agent layer are ruptured by the applied pressure upon pressure-sensitive retransfer to release the perfume and give out fragrance which in turn drowns such as offensive odor. Further, reality can be imparted to a retransferred image by properly selecting colors of the image and the fragrance, so that the worker takes delight in the operation of image-retransfer and his pain is eased, resulting in increase in labor efficiency.

By forming the aforesaid surface treating agent layer on a substrate, an image-retransferable sheet having improved properties can be obtained with respect to heat-sensitive transferring property, pressure-sensitive retransferring property, image-rubbing resistance upon handling, fixability upon pressure-sensitive retransfer and rubbing resistance of a retransferred image, as well as easy confirmation of completion of image-retransfer. Further, an offensive smell generated during the operation of image-retransfer can be drowned, and fragrance can be added to a retransferred image.

The present invention is further explained below with reference to the following Examples, but the present invention should not be construed as being limited thereto.

EXAMPLE 1

Five parts by weight of perfume-enclosing microcapsules prepared by a gelatin/polyanion complex coacervation method was dispersed in a solution containing 95 parts by weight of polyethylene ("Chemipal M-200", produced by Mitsui Petrochemical Industries Ltd.). The dispersion was then coated on a polyethylene terephthalate film having a thickness of 50 microns and dried at 80° C. to form a surface treating agent layer having a smooth surface and having a water-contact angle of 39° and a coefficient of static friction of about 0.42. The surface treating agent had a melt viscosity at 150° C. of about 2,000 to 4,000 poises and the layer thereof had a tensile strength of about 20 kg/cm$^2$.

Then, an ink was thermally transferred imagewise onto the thus prepared image-retransferable sheet using a heat-sensitive transferring type word processor ("P-touch", produced by Brother Industries Co., Ltd.), whereby a dry-processing type image-transferring material having an ink image was obtained. In the heat-sensitive transfer, the ink image was formed with good image quality by application of low thermal energy, as compared to the case of using a conventional image-retransferable sheet.

Figure 2:
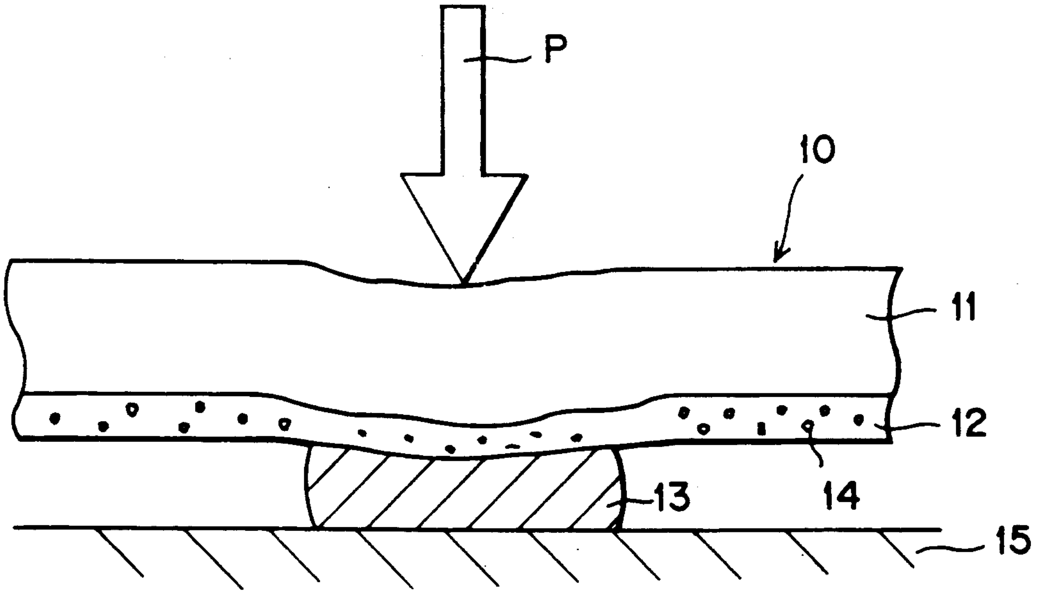
FIG. 2 illustrates the state of retransferring an image from an image-retransferable sheet of the present invention to an image-receiving substance by application of pressure to the sheet.

As shown in FIG. 2, the dry-processing type image-transferring material was brought into contact with image-receiving substance 15 (e.g., paper, plastic substances, etc.) and applied pressure P on the back surface of substrate 11 to perform pressure-sensitive retransfer. As a result, a retransferred ink image having good image quality was formed on the substance 15. During the pressure-sensitive retransfer, the dry-processing type image-transferring material could be fixed in situ so that perfect retransfer was done without any difficulty. Further, the applied pressure P ruptured the perfume-enclosing microcapsules 14 in the surface treating agent layer 12, giving out fragrance which drowned an offensive odor emitted from the ink image 13. Furthermore, the surface treating agent as well as the perfume were transferred together with the ink image, so that it was easy to confirm completion of the image-retransfer and the retransferred image exhibited good rubbing resistance and had good smell.

EXAMPLE 2

On a polyamide film having a thickness of 100 microns was formed a surface treating agent layer in the same manner as in Example 1, except using a dispersion of 10 parts by weight of the same microcapsules in a solution containing 90 parts by weight of an ionomer ("Chemipal SA-100", produced by Mitsui Petrochemical Industries Ltd.). The thus obtained image-retransferable sheet had a smooth surface and had a water-contact angle of 76° and a coefficient of static friction of about 0.77. The surface treating agent had a melt viscosity at 150° C. of about 5,000 poises, and the layer thereof had a tensile strength of 15 kg/cm$^2$.

Using the thus prepared image-retransferable sheet, a dry-processing type image-transferring material was prepared in the same manner as in Example 1, with which pressure-sensitive retransfer was then carried out. As a result, a retransferred image having good image quality and good smell was formed on an image-receiving substance.

EXAMPLE 3

Five parts by weight of perfume-enclosing microcapsules prepared by a gelatin/polyanion complex coacervation method was dispersed in a solution containing 95 parts by weight of ethylene-vinyl acetate copolymer ("Chemical V-200", produced by Mitsui Petrochemical Industries Ltd.). The dispersion was then coated on a nylon film having a thickness of 100 microns and dried to form a surface treating agent layer having a smooth surface and having a water-contact angle of 85° to 90°, a coefficient of static friction of about 0.45 and an elongation of 600%.

An ink was thermally transferred imagewise onto the thus prepared image-retransferable sheet using a heat-sensitive transferring type word processor ("P-touch", produced by Brother Industries Co., Ltd), whereby a dry-processing type image-transferring material having an ink image was obtained. In the heat-sensitive transfer, the ink image was formed with good image quality by application of low thermal energy, as compared to the case of using a conventional image-retransferable sheet.

Figure 3:
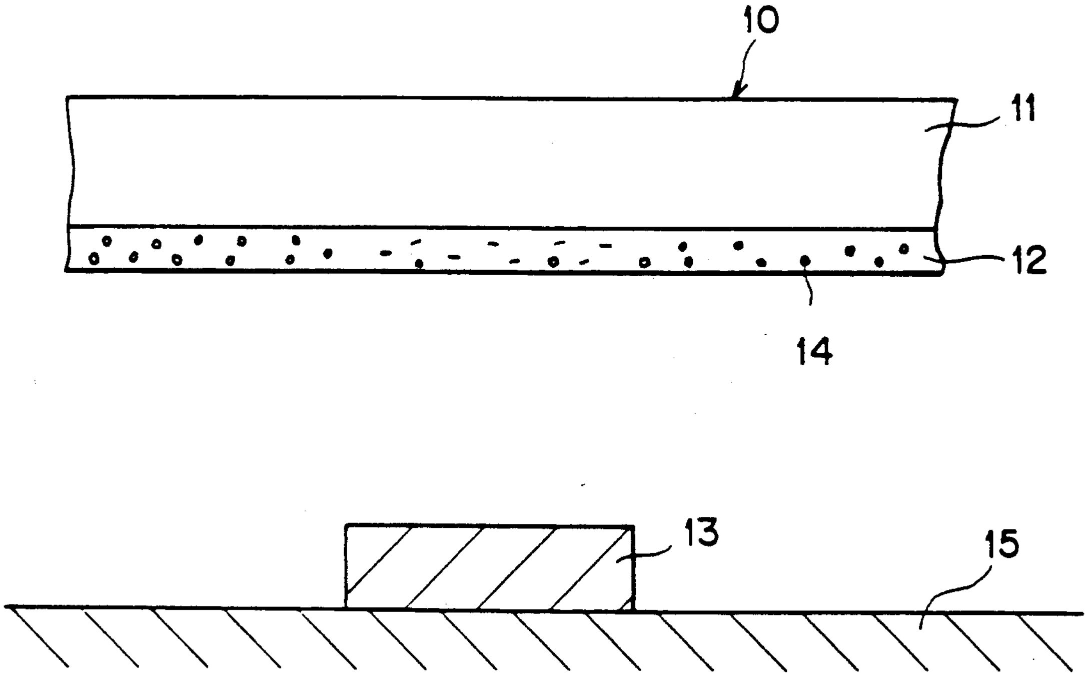
FIG. 3 illustrates the state that the image-retransferring operation has been completed using an image-retransferable sheet of the present invention.

Then, pressure-sensitive retransfer of the ink image was carried out in the same manner as in Example 1. As a result, a retransferred ink image having good image quality was formed on an image-receiving substance as shown in FIG. 3. During the pressure-sensitive retransfer, the dry-processing type image-transferring material could be fixed in situ so that perfect retransfer was done without any difficulty. Further, the applied pressure ruptured the perfume-enclosing microcapsules in the surface treating agent layer, giving out fragrance which drowned an offensive odor emitted from the ink image.

In the above-described preparation of the image-retransferable sheet, the thickness of the surface treating agent layer was changed to 1, 3, and 5 microns, respectively. As a result, the better image-retransferring property was obtained with the thicker surface treating agent layer. This would be because the thicker layer exhibits the larger elongation.

EXAMPLE 4

A surface treating agent layer was formed on a polyethylene terephthalate film having a thickness of 50 microns in the same manner as in Example 1, except using a coating composition having the following formulation. Thus, an image-retransferable sheet having a smooth surface was prepared. The surface treating agent layer had a water-contact angle of 93°, a coefficient of static friction of about 0.43 and an elongation of 600%.

| Formulation of Coating Composition: | parts by weight |
|---|---|
| Ethylene-vinyl acetate copolymer ("EVAFLEX640", produced by Mitsui duPont Polychemical Co.) | 9 |
| Polyethylene wax ("Hai-wax 100P", produced by Mitsui Petrochemical Industries Ltd.) | 1 |
| Perfume-enclosing microcapsules as in Example 1 | 1 |
| Toluene | 89 |

Using the thus prepared image-retransferable sheet, a dry-processing type image-transferring material was prepared in the same manner as in Example 1, with which pressure-sensitive retransfer was then carried out. As a result, a retransferred image having good image quality and good smell was formed on an image-receiving substance.

While the present invention has been described in detail with reference to specific embodiments thereof, it will be apparent to one skilled in the art that various changes and modifications can be made therein without departing from the spirit and scope thereof.

What is claimed is:

1. An image-retransferable sheet for transferring an image onto an image receiving member, comprising:

a substrate having a contact surface, said substrate having a thickness in a range of 25 μm to 200 μm;

a surface treating agent layer, having a first and second surface, formed on said substrate, wherein said first layer of said surface treating agent layer is in contact with said contact surface of said substrate and said image is transferably formed on said second surface of said surface treating agent layer, the surface treating agent layer having a tensile strength of 1 to 100 kg/cm$^2$ or an elongation of at least 100% for facilitating retransfer of the image onto the image receiving member; and pressure-rupturing microcapsules enclosing a perfume dispersed within said surface treating agent layer.

2. The image-retransferable sheet of claim 1, wherein said surface treating agent layer has one of a melting point of at least 100° C., a softening point of at least 100° C., and a melt viscosity at 100° C. of at least 1,000 poises.

3. The image-retransferable sheet of claim 1, wherein said surface treating agent layer is finely dispersed on said substrate.

4. The image-retransferable sheet of claim 1, wherein said surface treating agent layer has an elongation of at least 100%.

5. The image-retransferable sheet of claim 4, wherein said elongation is attained by inclusion of ethylenevinyl acetate copolymer in the surface treating agent layer.

6. The image-retransferable sheet of claim 4, wherein said elongation is attained by inclusion of polyethylene in the surface treating agent layer.

7. The image-retransferable sheet of claim 4, wherein said surface treating agent layer has a coefficient of static friction of at least 0.25 and a water-contact angle of 80° to 120°.

8. An image-retransferable sheet for transferring an image onto an image receiving member, comprising:

a substrate having a contact surface, said substrate having a thickness in a range of 25 μm to 200 μm;

a surface treating agent layer, having a first and second surface, formed on said substrate, wherein said first layer of said surface treating agent layer is in contact with said contact surface of said substrate and said image is transferably formed on said second surface of said surface treating agent layer, the surface treating agent layer having a tensile strength of 1 to 100 kg/cm$^2$ for facilitating separation of the image and a portion of the surface treating agent layer, said portion being substantially superposed with the image, from the contact surface of the substrate and for integrally retransferring the image and said portion of the surface treating agent layer onto the image receiving member; and pressure-rupturing microcapsules enclosing a perfume dispersed within said surface treating agent layer.

9. The image-retransferable sheet of claim 8, wherein said surface treating agent layer has a melting or softening point of at least 100° C. or a melt viscosity at 100° C. of 1000 poises.

10. The image-retransferable sheet of claim 8, wherein said surface treating agent layer is formed using a fine dispersion.

11. An image-retransferable sheet for transferring an image onto an image receiving member, comprising:

a substrate having a contact surface, said substrate having a thickness in a range of 25 μm to 200 μm;

a surface treating agent layer, having a first and second surface, formed on said substrate, wherein said first layer of said surface agent treating layer is in contact with said contact surface of said substrate and said image is transferably formed on said second surface of said surface treating agent layer, the surface treating agent layer having an elongation of at least 100% for facilitating separation of the image from the second surface of said surface treating agent layer and for retransferring the image only, onto the image receiving member; and pressure-rupturing microcapsules enclosing a perfume dispersed within said surface treating agent layer.

12. The image-retransferable sheet of claim 11, wherein said elongation is attained by inclusion of ethylenevinyl acetate copolymer in the surface treating agent layer.

13. The image-retransferable sheet of claim 11, wherein said elongation is attained by inclusion of polyethylene in the surface treating agent layer.

14. The image-retransferable sheet of claim 11, wherein said surface treating agent layer has a coefficient of static friction of at least 0.25 and a water-contact angle of 80° to 120°.

* * * * *